E. C. HERRMANN.
ROBE HOLDER.
APPLICATION FILED FEB. 2, 1914.
1,147,167.
Patented July 20, 1915.
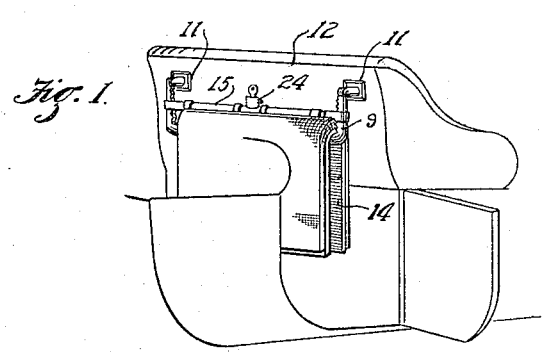
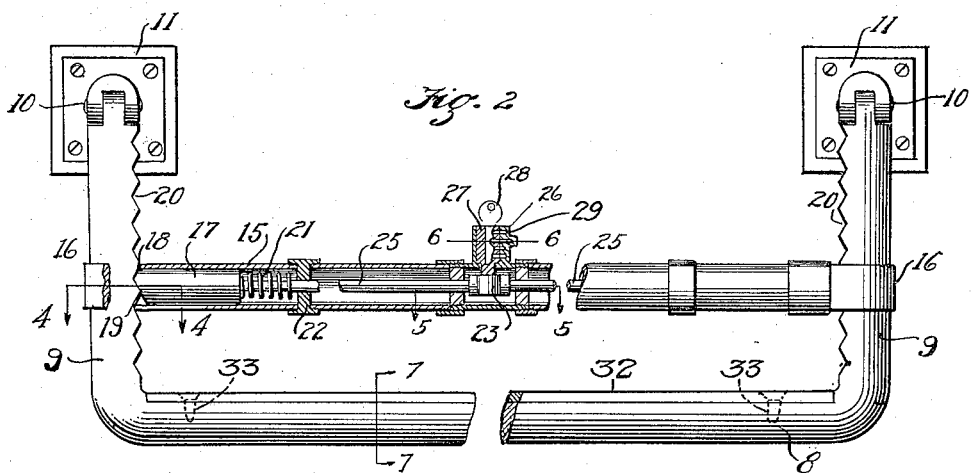
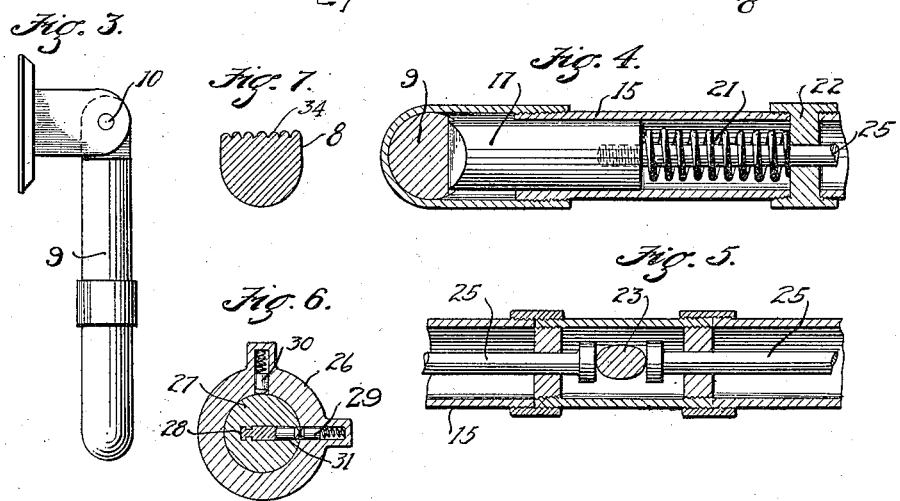
Witnesses:—
James M. Abbott
Marguerite Bates
By.
Inventor
Eugene C. Herrmann.
Attys.

UNITED STATES PATENT OFFICE.

EUGENE C. HERRMANN, OF LOS ANGELES, CALIFORNIA.

ROBE-HOLDER.

1,147,167.  Specification of Letters Patent.  Patented July 20, 1915.

Application filed February 2, 1914. Serial No. 815,945.

*To all whom it may concern:*

Be it known that I, EUGENE C. HERRMANN, a citizen of the United States, residing at Los Angeles, in the county of Los Angeles, State of California, have invented new and useful Improvements in Robe-Holders, of which the following is a specification.

This invention relates to a robe holder.

It is the object of this invention to provide a device for attachment to vehicles by means of which lap robes and the like may be held and securely locked against malicious removal.

A further object is to provide an effective robe locking device with key controlled means for locking a robe in the device against removal, which is adapted to be freely operated when unlocked to permit the ready removal of the robe from, and replacement in the holder, and which will operate to clamp the robe when in its unlocked position.

The invention primarily resides in a robe receiving bar having pivoted parallel extending end portions, a movable bar arranged parallel with the robe carrying bar and slidable on the end portions of the latter, means for normaly engaging the slidable bar in locked engagement on the end portions in relation to the robe carrying bar.

The invention is illustrated in the accompanying drawings, in which,

Figure 1 is a perspective view showing the invention as applied. Fig. 2 is a detail front elevation partly in vertical section of the robe holder. Fig. 3 is an end view of same. Fig. 4 is a detail horizontal section on the line 4—4 of Fig. 2. Fig. 5 is a detail horizontal section on the line 5—5 of Fig. 2. Fig. 6 is a detail horizontal section on the line 6—6 of Fig. 2. Fig. 7 is a detail cross section of a modified form of the robe engaging bar.

In the drawings, 8 indicates a bar of any suitable construction, here shown as approximately semi-circular in cross section and formed with parallel laterally extending end portions 9, which are pivoted at 10 to brackets 11 adapted to be secured to back of a vehicle seat 12, or other desired support.

The bar 8 is designed to be arranged horizontally and by reason of its pivotal mounting 10 is adapted to swing outwardly from its supporting brackets 11. The present invention resides in a means for clamping and locking a robe 14 on the horizontally extending robe supporting bar 8. This means is here shown as consisting of a tubular bar 15 having its ends secured to sleeves 16 which slidably encircle the end portions 9 of the bar to permit of vertical adjustment of the bar 15 in relation to the robe supporting bar 8.

Slidably mounted in each end of the tubular bar 15 are latch-bolts 17, the outer ends of which are formed with convergent or oppositely inclined faces 18 and 19 adapted to extend into V-shaped notches or rack teeth 20 formed on the inner face of the end portions 9; the bolts 17 being normally held in engagement with the rack teeth 20 by means of coiled springs 21 which bear between the rear faces of the latch-bolts 17 and shoulders 22 formed in the bar 15. The inclined or convergent faces 18 and 19 of the latch-bolt 17 are designed to freely ride over the rack teeth 20 on upward or downward movement of the bar 15 when the latch-bolts 17 are not locked against retraction; the latch-bolts 17 moving in opposition to the spring 21 when riding over the rack teceth 20. Means are provided for locking the latch-bolts 17 from a common point mediate the ends of the bar 15, which means is here shown as consisting of an elliptical cam block 23 attached to any suitable form of lock indicated at 24 and adapted to be turned to extend either longitudinally or transversely of the tubular bar 15 in the interior thereof.

Attached to the inner ends of the latch-bolts 17 are stems 25 which extend longitudinally of the tubular bar and terminate adjacent the cam block 23 and in such relation to the latter that when the cam block is disposed with its major axis arranged longitudinally of the bar 25 its ends will slidably engage the ends of the stems 25 which will abut against the cam block and thereby be held against retraction. The stems 25 are of such length in relation to the bolts 17 and the cam block 23 that when the latter is turned to the position just described the bolts 17 will be disposed in engagement with the rack teeth. When the cam-block 23 is turned to position its longitudinal axis transverse to the bar 25 sufficient space is formed between its sides and the ends of the stems 25 to permit the latch bolts 17 being retracted by upward or downward movement of the bar 15 before described.

The lock 24 is of such character as to automatically lock and retain the cam block in either of the two positions described and may be of any desired construction. This lock is here shown as of the ordinary tumbler type having a casing 26, inclosing a rotary cylinder 27 on which the cam block 23 is mounted; the cylinder 27 being provided with a key-way for the reception of a serrated key 28 adapted to operate the usual spring-pressed tumblers 29 mounted in the cylinder and lock casing. This lock necessarily differs from the usual tumbler lock in order to adapt it to lock in two positions. It is accordingly constructed as shown in Fig. 6, that is, with a second set of spring-pressed locking tumblers 29 arranged in the casing 26 at right angles to the usual locking tumblers 29. By this arrangement when the actuating tumblers 31 in the cylinder 27 are turned to register with the locking tumblers 29 and the key 28 withdrawn, the cylinder 27 will be engaged by the locking tumblers 29 and held in such position that the cam block 23 will be disposed longitudinally of the bar 15 and in its robe locking position, and when the cylinder 27 is turned a quarter of a revolution to dispose the actuating tumblers 31 in register with the locking tumblers 29 and the key withdrawn the cam block 23 will be disposed in its transverse position out of locking engagement with the stems 25.

In the operation of the invention, when it is desired to lock a robe in the device, the cam block is positioned in its transverse position and the bar 15 is raised to a sufficient height on the end portions 9 of the bar 8 to permit the robe 14 being placed over the latter. The bar 15 is then moved downward and crowded against the portion of the robe 14 extending over the bar 8, as shown in Fig. 1; the latch-bolts 17 engaging the rack-teeth by the action of the springs 21 and holding the bar 15 against the robe. When it is desired to lock the bar 15 in its robe engaging position the key 28 is inserted in the key-way and the lock cylinder 27 to properly position the actuating tumblers 31; and the cylinder 27 is rotated a quarter of a revolution to dispose the cam block 23 in its locking position whereby the bar 15 is securely held against movement.

As a means for increasing the frictional engagement of the robe 14 by the device, the upper edge of the horizontal bar 8 is fitted with a robe engaging means which is here shown as consisting of a seat 32 which may be formed of rubber or leather, or any other suitable material held in place on the bar 8 by means of screws 33. If it is desired, the same purpose may be accomplished by forming longitudinal corrugations 34 on the upper face of the bar 8 as shown in Fig. 7.

What I claim is:

1. A robe holder, comprising a horizontal robe supporting bar having pivoted upturned end portions, rack teeth on the inner faces of said end portions having outwardly inclined faces on each side thereof, a clamping bar slidable on said end portions and paralleling the supporting bar, latch-bolts on the clamping bar normally engaging said rack teeth and adapted to ride in and out of engagement with the rack teeth on moving the locking bar in either direction when unlocked, and means for locking the latch-bolts in engagement with the rack teeth.

2. A robe holder, comprising a horizontal robe supporting bar having pivoted upturned end portions, rack teeth on said end portions having outwardly inclined faces on the opposite sides thereof, a clamping bar slidable on said end portions extending parallel with the supporting bar, spring-pressed latch-bolts slidably mounted on said clamping bar, normally engaging the rack teeth and adapted to ride out and in engagement with the rack teeth on moving the locking bar in either direction when unlocked, stems on said latch-bolts extending longitudinally of the clamping bar and spaced apart at their ends, a cam-block interposed between the ends of said stem and adapted to be turned in and out of engagement with said stems, and key-controlled means for locking said cam-block in both positions.

In witness that I claim the foregoing I have hereunto subscribed my name this 20th day of January, 1914.

EUGENE C. HERRMANN.

Witnesses:
 EDMUND A. STRAUSE,
 MARIE BATTEY.